July 19, 1949.  C. A. WHISMAN  2,476,437

FISHING REEL

Filed Nov. 17, 1945

INVENTOR:
CLAUD A. WHISMAN.
BY W. E. Beatty
ATTORNEY.

Patented July 19, 1949

2,476,437

UNITED STATES PATENT OFFICE 2,476,437

FISHING REEL

Claud A. Whisman, Burbank, Calif.

Application November 17, 1945, Serial No. 629,260

12 Claims. (Cl. 242—84.5)

The invention relates to a fishing reel and more particularly to a reel commonly referred to as a fresh water reel or trout reel. The invention relates to a fishing reel having a friction clutch between the spool and its handle.

An object of the invention is to automatically reduce the drag on the clutch when the spool is unwound by pulling out the line thereon, assuming that the handle is free to move backwards, thereby reducing the likelihood that a sudden pull would break the line or leader. Preferably under those conditions, the drag on the clutch is not entirely eliminated but is reduced to a safe value to prevent free spool operation and thereby prevent a back lash due to the spool overrunning the line.

The invention further relates to improved means under control of the usual winding or unwinding rotation of the handle, for increasing or decreasing the drag on the clutch when a fish or the like is pulling out the line and unwinding the spool against the drag of the clutch. According to the invention the drag varying means is operated only over a limited range of movement of the handle. When it is desired to reel in the line, the continued forward rotation of the handle adjusts the clutch drag to its point of maximum drag, the drag remaining at its maximum during continued forward rotation of the handle. Means are provided for adjusting the amount of the minimum and maximum drag before using the reel.

A further object of the invention is to gradually change the drag between readily ascertainable minimum and maximum values by rotating the spool handle through a desired angle preferably less than 360°, and to leave the drag at its maximum value while continuing to rotate the handle in a forward direction, while permitting the clutch to slip if at any time the pull on the line exceeds whatever value the drag may then have.

Another object of the invention is to employ the friction clutch for the double function of acting under control of a main spring for engaging the clutch with a relatively large pressure when the handle is operated in a forward position, with provisions for removing the control of the clutch from that spring and subjecting it to the control of the relatively weak drag spring when the handle is rotated in a reverse direction to the position of minimum drag. The shift from one to the other is gradual, adjustable and under control of the forward and reverse angular position or rotation of the handle.

Another feature of the invention relates to an arrangement whereby the clutch controlling means, by a simple adjustment may be adapted for use either by a right-handed or left-handed angler.

Other features of the invention relate to an adjustable device for taking up wear on the clutch, and to an improved adjustment for the clutch spring.

For further details of the invention reference may be made to the drawings wherein Fig. 1 is a view in elevation, with parts broken away, of a fishing reel according to the present invention.

Figure 1:
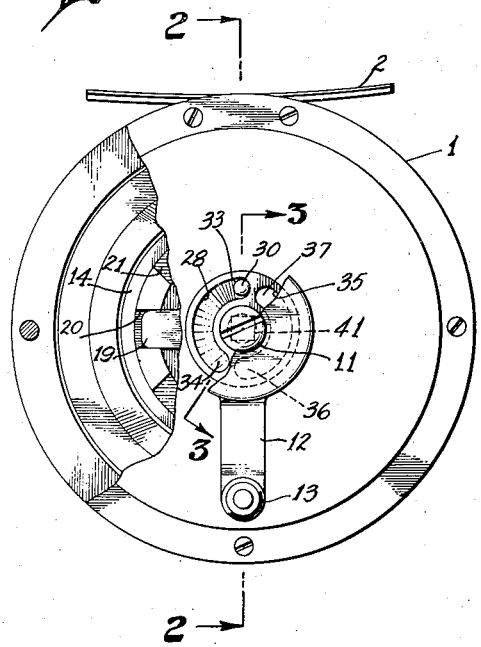

Referring in detail to the drawings, the fishing reel 1 has the usual reel seat 2 and comprises a frame having a back plate 3 and a front plate 4 held together by the usual cross rods as indicated at 5 and 6.

The reel 1 has a spool 7 which is mounted on a shaft 8, the spool 7 and shaft 8 being relatively rotatable. Shaft 8 is mounted for rotary movement and for movement lengthwise of its axis, by a bearing 9 in the back plate 3 and by a bearing 10 in the front plate 4. Fixed to the shaft 8 by a screw 11 is a crank 12 having a handle 13.

Cast integral with or otherwise fixed to shaft 8 is a clutch plate 14. Plate 14 comprises one member of a friction clutch having a cooperating member in the form of a ring 15 of friction material suitably secured to the spool flange 16. The clutch plate 14 is urged into engagement with the friction material 15 by means of a compression spring 17. Spring 17 has a central collar 18 which slidably and rotatably fits on the front end of shaft 8. Radiating from collar 18 is a plurality of spring arms 19. To vary the force of spring 17, the outer ends of arm 19 fit in recesses such as 20 of a certain depth, or it may be shifted to recesses such as 21 of a different depth, the spring adjustment being made by taking the reel apart and before the reel is put into use. The recesses 20 and 21 are arranged in the face of the clutch plate 14 and while two sets of recesses 20 and 21 are shown, a larger or smaller number may be used.

Figure 2:
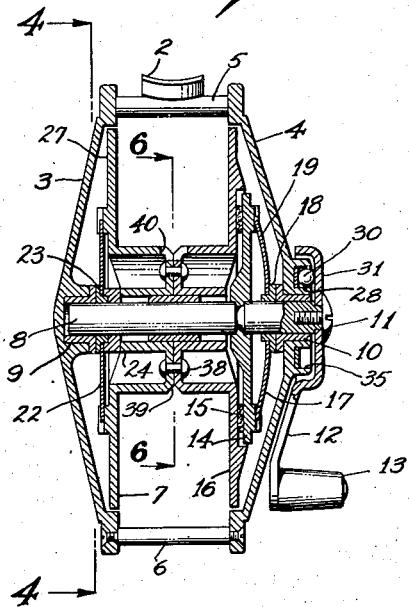
Fig. 2 is a sectional view on line 2—2 of Fig. 1 looking in the direction of the arrows.

As shown in Fig. 2, the outer end of collar 18 bears against the inner face of bearing 10, the latter serving as a stop for outward movement of the collar 18.

The force of spring 17 is comparatively large, while a comparatively weak drag spring 22, similar in construction to spring 17, is arranged at the rear side of spool 7. In Fig. 2, spring 22 appears flat instead of convex like spring 17 because in Fig. 2, spring 17 overpowers spring 22, spool 7 being in its farthest position to the left with maximum drag on the spool. Spring 22 comprises a plurality of arms which radiate from a collar 23 which rotatably and slidably fits on the rear end of shaft 8. The rear face of collar 23 bears on the front face of bearing 9, the latter serving as a stop for collar 23. Also in the position of adjustment shown in Fig. 2, bearing 9 serves as a stop to limit endwise movement of spool 7 to the left, as the inner end of the spool hub 24 rotatably bears against the right end of collar 23 and the left end of collar 23 rotatably bears against the bearing 9.

Figure 4:
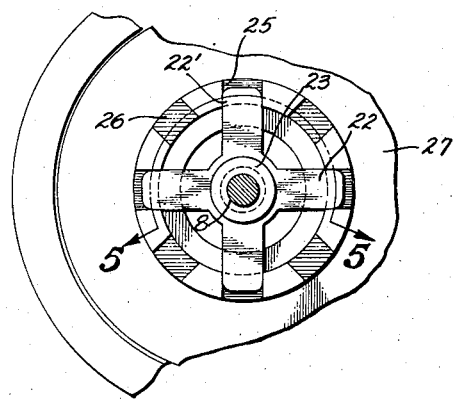
Fig. 4 is a vertical sectional view on line 4—4 of Fig. 2 looking in the direction of the arrows.
Figure 3:
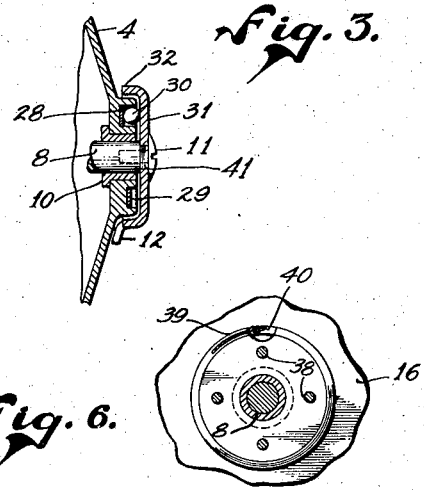
Fig. 3 is a sectional view on the broken line 3—3 of Fig. 1 looking in the direction of the arrows.

As shown in Fig. 4, the drag spring 22, like the main spring 17 has four arms as indicated at 22' and a plurality of sets of notches of different depths as indicated at 25 and 26, are provided in the spool flange 27 so that the force of spring 22 may be adjusted to a suitable value.

As the spring collar 18 bears against the bearing 10 which serves as a fixed stop, the spring 17 tends to move shaft 8 and the clutch plate 14 towards back plate 3 to engage the clutch. Means are provided for variably restraining the force of spring 17 by moving clutch plate 14 and connected shaft 8 in the opposite direction, to the right, to vary the force of spring 17 on the clutch. The force of spring 17 in its action on the friction member 15 may be reduced substantially to zero, and instead of leaving the spool 7 in a free-spool condition, the clutch 14, 15, serves as a drag clutch acted on only by the weak drag spring 22. The spool 7 is slidable on shaft 8 and when the force of spring 17 is removed, spring 22 is operative to force the friction material 15 into engagement with the clutch plate 14. For this purpose, means are provided under the control of the usual rotation of handle 13, for reciprocating shaft 8 to vary the control of springs 17 and 22 as above described. To this end, the front plate 4 is provided with a cam groove 28, for use by a right-handed angler, groove 28 gradually increasing in depth from its shallow end 34 to its deep end 33 in a clockwise direction as seen in Fig. 1. The bottom of groove 28 is provided with a hardened steel liner 29. Riding in the groove 28 on liner 29 is a cam follower in the form of a ball 30. Supported by the ball 30 is a retainer for spring 17 in the form of a cap 31 having an inturned flange 32. The cap 31 is an integral part of the crank 12. Cap 31 has a square central hole fitting on a square portion 41 of shaft 8. Cap 31 is held in position on shaft 8 by screw 11. The spring 17 in pushing on the clutch plate 14 tends to push shaft 8 and retainer cap 31 to the left as seen in Fig. 2 and the extent of such movement is determined by the position of ball 30 in the cam groove 28, cap 31 being urged against ball 30 by spring 17. As handle 13 rotates shaft 8 counterclockwise, the ball 30 through its frictional engagement with the cap 31, follows such movement until it reaches the shallow end 34 of groove 28. However, as handle 13 rotates shaft 8 in a clockwise direction, the ball 30 through its frictional engagement with the cap 31 follows such movement until it reaches a position where the clutch plate 14 is in full engagement with the friction material 15. For example, this point may be approximately 10° before the ball 30 reaches the deep end 33 of groove 28, the advantage of this leeway being that wear on the clutch 14, 15 is compensated for automatically, because as this clutch wears, the handle 13 and cap 31 will simply be moved forward a little more in arriving at the point where the ball 30 drops away from cap 31, with clutch 14, 15 in full engagement.

When handle 13 is rotated clockwise as seen in Fig. 1, namely in a forward direction to wind up the line on spool 7, the ball 30 rides towards the deepest end 33 of cam slot 28 as shown in Fig. 1, thereby permitting spring 17 to move shaft 8 to the left as shown in Fig. 2 to the position where spring 17 overcomes spring 22 and applies maximum frictional engagement between clutch plate 14 and friction material 15. Continued rotation in the same direction leaves ball 30 in the forward end of groove 28 with maximum drag on the spool. If the line on spool 7 is pulled out at this time, the pull is opposed by the maximum drag on spool 7. If the hand is removed from handle 13, however, a pull on the line at the time of maximum drag will rotate spool 7 in a reverse direction whereby cap 31 will frictionally engage ball 30 and roll it counterclockwise in groove 28 to reduce the drag to a point where the spring 17 no longer causes enough frictional engagement between cap 31 and ball 30 to move it counterclockwise any farther. The drag can be restored or maintained at any suitable value within the limits chosen, by angularly adjusting the crank 12.

In the preceding description reference was made to the fact that for clockwise rotation of the handle 12, the clutch is fully engaged about ten degrees before the ball 30 reaches the deep end 33 of groove 28. This means that the ball 30 has some free play at the extreme deep end 33 of groove 28 and it will be noted that the ends of groove 28 and also, the ends of the cam groove 35 are on a line which is tilted clockwise from vertical for the reason that the fishing rod is normally held at a position tilted up from horizontal and at that position the ends 33, 34, 36, 37 of grooves 28 and 35 are substantially vertical. At any rate, for the position of the fishing rod when horizontal, with the reel in the position shown in Fig. 1, or for any position of the fishing rod with its tip pointed upwardly and with the fishing reel 1 correspondingly tilted, the ball 30 drops by gravity from the deep end 33 of groove 28 into engagement between the cap 31 and the groove 28 whereby if the hand is removed from handle 12 and the fish pulls out the line, the cap 31 will frictionally engage the ball 30 and roll it counter-clockwise around groove 28 to the shallow end 34 of this groove. In other words, groove 28 leads in a downward direction to the shallow end 34 of this groove so that the ball 30 will drop out of the deep end 33 where it has some free play, into engagement between cap 31 and groove 28. Similar action takes place if the ball 30 is in the other groove 35, and reel 1 reversed for left hand operation.

The reel 1 is, of course, intended to be suspended from a fishing rod having a butt at the left of Fig. 1 and a tip at the right of Fig. 1. Also if the groove 28 has a length of about one-half circle or less, this makes it possible to provide the front plate 4 with another cam groove 35 for use by a left-handed angler. Groove 35 has its shallow end at 36 and its deep end at 37. The reel may be converted for use by a left-handed angler, by removing the stop cap 31, and by placing the ball 30 in the groove 35.

Figure 6:
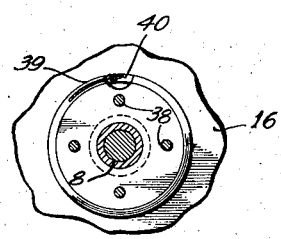
Fig. 6 is a sectional view on line 6—6 of Fig. 2 looking in the direction of the arrows.
Figure 5:
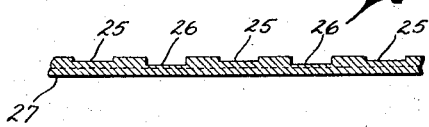
Fig. 5 is a developed sectional view of the spring notches on the curved line 5—5 in Fig. 4.

The spool 7, as shown in Fig. 2, may be cast or stamped in two parts having a parting line in a plane at right angles to the axis of the spool, at the middle of the spool, these spool halves being suitably secured together as by rivets 38. Also, as shown in Figs. 2 and 6, the adjacent hub portions of the spool halves may be provided with a groove 39 to receive the fishing line and with a recess 40 to receive the knot.

While various depths of cam groove may be employed, it may, for example, vary from one-sixteenth of an inch at its shallow end 34 or 36 to one-eighth of an inch at its deep end 33 or 37. The force of drag spring 17 may have any suitable value. A maximum drag of one and one-half pounds has proven satisfactory, although other values may be employed. In fact, one advantage of the type of spring indicated at 17 is that the force of this spring, which may be of phosphor bronze material, can be readily changed by taking the reel apart and if the force of the spring is to be increased, the spring arms are bent so as to make them more curved, while if the force is to be reduced, the spring arms are bent so as to make them less curved. Also the spring tension, of course, can be varied by adjusting the spring from one step or recess 20, 21, 25, 26 to another.

I wish it to be understood that I do not desire to be limited to the exact details of construction shown and described, for obvious modifications will occur to a person skilled in the art.

I claim:

1. A fishing reel comprising a shaft, a spool rotatably supported on said shaft, a winding handle fixed to said shaft, a friction clutch having a clutch member on said shaft and a cooperating clutch member on said spool, means supporting said shaft for rotary and axial movements, a compression spring acting on said shaft clutch member and tending to engage said clutch, a retainer on said shaft for said spring, and cam means actuated by said retainer and operated by rotation of said handle for axially shifting said shaft and said retainer to vary the force of said spring.

2. A fishing reel comprising a shaft, a spool journaled on said shaft, a handle fixed to said shaft, a friction clutch between said shaft and said spool, a compression spring tending to close said clutch, and means responsive to the unwinding of said spool to reduce the force of said spring on said clutch from a greater to a lesser value when said handle is released.

3. A fishing reel comprising a shaft, a spool journaled on said shaft, a handle fixed to said shaft, a friction clutch between said shaft and said spool, a compression spring tending to close said clutch, and means responsive to the winding rotation of said handle for increasing the force of said spring for a portion only of the winding movement and not for the remainder.

4. A fishing reel comprising a shaft, a spool journaled on said shaft, a handle fixed to said shaft, a friction clutch between said shaft and said spool, a compression spring tending to close said clutch, and means responsive to the winding rotation of said handle for increasing the force of said spring on said clutch, said means being responsive to the unwinding rotation of said handle to decrease the force of said spring on said clutch.

5. A fishing reel comprising a shaft, a spool journaled on said shaft, a rotary handle fixed to said shaft, a friction coupling between said shaft and said spool, a compression spring tending to increase the drag of said coupling, a retainer for said spring and cam means operated by rotary movement of said handle in the direction of winding for shifting said retainer in one direction for gradually increasing the force of said spring on said coupling over a range of the winding movement, said cam means being operative on unwinding movement of said handle as well as on unwinding movement of said spool when said handle is released to shift said retainer in the opposite direction to gradually decrease the force of said spring on said coupling over a range of the unwinding movement.

6. A fishing reel comprising a spool, a handle therefor, means supporting said handle for rotary movement about the axis of said spool and for movement lengthwise of said axis, a friction clutch between said handle and said spool, a relatively strong compression spring at one end of said spool tending to close said clutch, a relatively weak drag spring at the other end of said spool tending to close said clutch, a retainer for said compression spring associated with said handle, and means operable on rotation of said handle in opposite directions to move said retainer and shift said friction clutch from the control of one of said springs to the other.

7. A fishing reel comprising a spool, a handle therefor, a friction clutch between said spool and said handle, said friction clutch having a clutch member on said spool, a cooperating clutch member for said handle, a relatively strong compression spring tending to engage said clutch members in one direction, a relatively weak drag compression spring tending to engage said clutch members in the opposite direction, and means operated by rotary movement of said handle for increasing the force of either one of said compression springs and for decreasing the force of the other spring.

8. A fishing reel according to claim 1 wherein said cam means comprises a ball, and a cooperating cam groove, said groove being concentric with said shaft and increasing in depth in the forward direction of rotation of said handle.

9. A fishing reel according to claim 1 having a frame and wherein said cam means comprises a ball, said frame having a pair of grooves for said ball, each of said grooves being concentric with said shaft and increasing in depth in the opposite directions of rotation of said handle, and means removably securing said retainer in position, whereby said retainer may be removed and said ball inserted in one of said grooves for right-handed operation or in the other groove for left-handed operation.

10. A fishing reel comprising a spool, a friction clutch member on said spool, a shaft, a cooperating clutch member on said shaft, a collar slidable on said shaft, a bearing supporting said shaft for reciprocating movement, compression spring arms radiating from said collar and acting on said shaft clutch member for urging said clutch members together, said bearing serving as a stop for said collar, and means for reciprocating said shaft to vary the force of said spring.

11. A fishing reel comprising a shaft, a spool journaled on said shaft, a handle fixed to said shaft, a friction clutch having a clutch member on said shaft and a cooperating clutch member on said spool, a compression spring acting on said shaft clutch member and tending to engage said clutch, means supporting said shaft for rotary and axial movements, and means for axially shifting said shaft consequent upon winding or unwinding movement of said handle to vary the force of said spring.

12. A fishing reel according to claim 1 having a frame and wherein said cam means comprises a ball and a cooperating cam groove in said frame, said groove being concentric with said shaft and increasing in depth in the forward direction of rotation of said handle, the deep end of said groove permitting free play of said ball when said friction clutch is fully engaged, and said groove leading in a downward direction from the deep end to the shallow end of said groove in a direction counter to the winding movement of the handle whereby said ball drops by gravity into engagement between said retainer and said groove.

CLAUD A. WHISMAN.

REFERENCES CITED

The following references are of record in the file of this patent:

UNITED STATES PATENTS

| Number | Name | Date |
|---|---|---|
| 837,489 | Myers | Dec. 4, 1906 |

FOREIGN PATENTS

| Number | Country | Date |
|---|---|---|
| 6,779 | Great Britain | Feb. 23, 1911 |
| 336,882 | Great Britain | Oct. 23, 1930 |